United States Patent
Cui

(10) Patent No.: US 10,203,476 B2
(45) Date of Patent: Feb. 12, 2019

(54) LENS ASSEMBLY

(71) Applicant: MICROSOFT TECHNOLOGY LICENSING, LLC, Redmond, WA (US)

(72) Inventor: Chengwu Cui, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 75 days.

(21) Appl. No.: 14/668,887

(22) Filed: Mar. 25, 2015

(65) Prior Publication Data

US 2016/0282584 A1    Sep. 29, 2016

(51) Int. Cl.
| | |
|---|---|
| *G02B 9/12* | (2006.01) |
| *G02B 9/14* | (2006.01) |
| *G02B 9/16* | (2006.01) |
| *G02B 13/02* | (2006.01) |
| *G02B 13/00* | (2006.01) |

(52) U.S. Cl.
CPC ............. *G02B 9/14* (2013.01); *G02B 9/16* (2013.01); *G02B 13/02* (2013.01); *G02B 9/12* (2013.01); *G02B 13/0035* (2013.01)

(58) Field of Classification Search
CPC ........ G02B 13/0035; G02B 9/12; G02B 9/14; G02B 9/16
See application file for complete search history.

(56) References Cited

U.S. PATENT DOCUMENTS

| | | |
|---|---|---|
| 7,554,753 B2 | 6/2009 | Wakamiya |
| 7,920,340 B2 | 4/2011 | Tang |
| 8,125,716 B2 | 2/2012 | Bryant et al. |
| 8,427,760 B2 | 4/2013 | Hsieh et al. |
| 8,654,457 B2 | 2/2014 | Jin et al. |

(Continued)

FOREIGN PATENT DOCUMENTS

| | | |
|---|---|---|
| JP | 2000292688 A | 10/2000 |
| JP | 2004233536 A | 8/2004 |

(Continued)

OTHER PUBLICATIONS

Tremblay, et al., "Ultrathin Cameras Using Annular Folded Optics", In Proceedings of Applied Optics, vol. 46, Issue 4, Feb. 1, 2007, pp. 463-471.

(Continued)

*Primary Examiner* — Darryl J Collins
*Assistant Examiner* — Journey F Sumlar

(57) ABSTRACT

Examples of the disclosure enable a mobile device to generate high quality images. In some examples, the mobile device includes a lens assembly that includes a first lens configured to provide positive optical power, and a telephoto stage including a second lens configured to provide negative optical power, and a third lens configured to perform one or more of increasing a sharpness and decreasing a distortion of an image associated with light transmitted through the lens assembly. The lens assembly has a track length that is less than or equal to approximately 6.0 mm and a focal length that is greater than or equal to approximately 7.3 mm. Aspects enable a lens assembly to be used in a mobile device environment, such that a mobile device including and/or associated with the lens assembly is configured to take high quality images.

20 Claims, 6 Drawing Sheets

(56) References Cited

U.S. PATENT DOCUMENTS

| | | |
|---|---|---|
| 8,760,776 B2 | 6/2014 | Hsieh et al. |
| 8,780,459 B2 | 7/2014 | Chen et al. |
| 8,810,922 B2 | 8/2014 | Engelhardt et al. |
| 2005/0253952 A1 | 11/2005 | Minefuji |
| 2011/0090392 A1* | 4/2011 | Tang .................. G02B 13/0035 348/345 |
| 2012/0162785 A1* | 6/2012 | Ko .................... G02B 13/0035 359/716 |
| 2013/0163098 A1* | 6/2013 | Lee .................... G02B 13/0035 359/716 |
| 2013/0258487 A1 | 10/2013 | Janeczko et al. |
| 2013/0271642 A1 | 10/2013 | Sano |
| 2014/0132749 A1 | 5/2014 | Hartman |
| 2014/0184875 A1* | 7/2014 | Ahn .................. G02B 13/0035 348/335 |
| 2014/0220713 A1 | 8/2014 | Dowski et al. |

FOREIGN PATENT DOCUMENTS

| | | |
|---|---|---|
| JP | 2007140006 A | 6/2007 |
| JP | 2008040317 A | 2/2008 |
| JP | 2008064884 A | 3/2008 |

OTHER PUBLICATIONS

Henderson, et al., "Adding Automated Focus to Biometric, Medical, and Industrial Micro Cameras", Retrieved on: Dec. 15, 2014, Available on: http://www.newscaletech.com/articles/Focus-considerations.pdf.

"International Search Report and Written Opinion Issued in PCT Application No. PCT/US2016/022525", dated Jun. 2, 2016, 13 Pages.

"Second Written Opinion Issued in PCT Application No. PCT/US2016/022525", dated Mar. 6, 2017, 8 Pages.

"International Preliminary Report on Patentability Issued in PCT Application No. PCT/US2016/022525", dated Jun. 8, 2017, 9 Pages.

* cited by examiner

LENS ASSEMBLY

BACKGROUND

Mobile devices, such as laptops, smartphones, tablets, and/or phablets, are increasingly used to take pictures. At least some pictures taken with known mobile devices are suitable for personal use (e.g., keepsake pictures). However, at least some mobile devices are restricted by current infrastructure (e.g., size requirements, hardware requirements) to take pictures suitable for other purposes, such as biometric identification, medical and diagnostic images, and/or machine vision. For example, at least some pictures for such purposes taken with known mobile devices have relatively low resolution, are out of focus, are blurry, and/or are not crisp when compared to pictures taken with dedicated systems, which are not constrained to a mobile device environment.

SUMMARY

Examples of the disclosure enable a mobile device to take high quality pictures suitable for purposes such as biometric identification, medical and diagnostic images, and/or machine vision. Some examples include a lens assembly including a first lens configured to provide positive optical power, and a telephoto stage including a second lens configured to provide negative optical power, and a third lens configured to perform increasing a sharpness and/or decreasing a distortion of an image associated with light transmitted through the lens assembly. In this example, the lens assembly has a track length that enables the lens assembly to fit within the mobile device (e.g., less than or equal to approximately 6.0 mm) and a focal length that enables the lens assembly to generate an image having a desired image resolution (e.g., greater than or equal to approximately 7.3 mm).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Examples of the disclosure enable a mobile device to take high quality pictures for sensitive use, such as biometric identification, medical and diagnostic images, and/or machine vision. Some examples include a lens assembly including a first lens configured to provide a positive optical power, and a telephoto stage including a second lens configured to provide a negative optical power, and a third lens configured to increase a sharpness and/or decrease a distortion of an image associated with light transmitted through the lens assembly. In this example, the lens assembly has a track length that is less than or equal to approximately 6.0 mm and a focal length that is greater than or equal to approximately 7.3 mm.

Aspects of the disclosure enable a lens assembly to be used in a mobile device environment, such that a mobile device including and/or associated with the lens assembly is configured to take high quality pictures. For example, the lens assembly described herein enables relatively-high image quality specifications to be satisfied by generating images having adequate resolution, magnification, minimal distortion, etc. By incorporating the lens assembly in the manner described in this disclosure, some examples enable miniaturization, e.g., require less space for functionality, improved usability, and/or enhanced reliability of a device.

Figure 1:
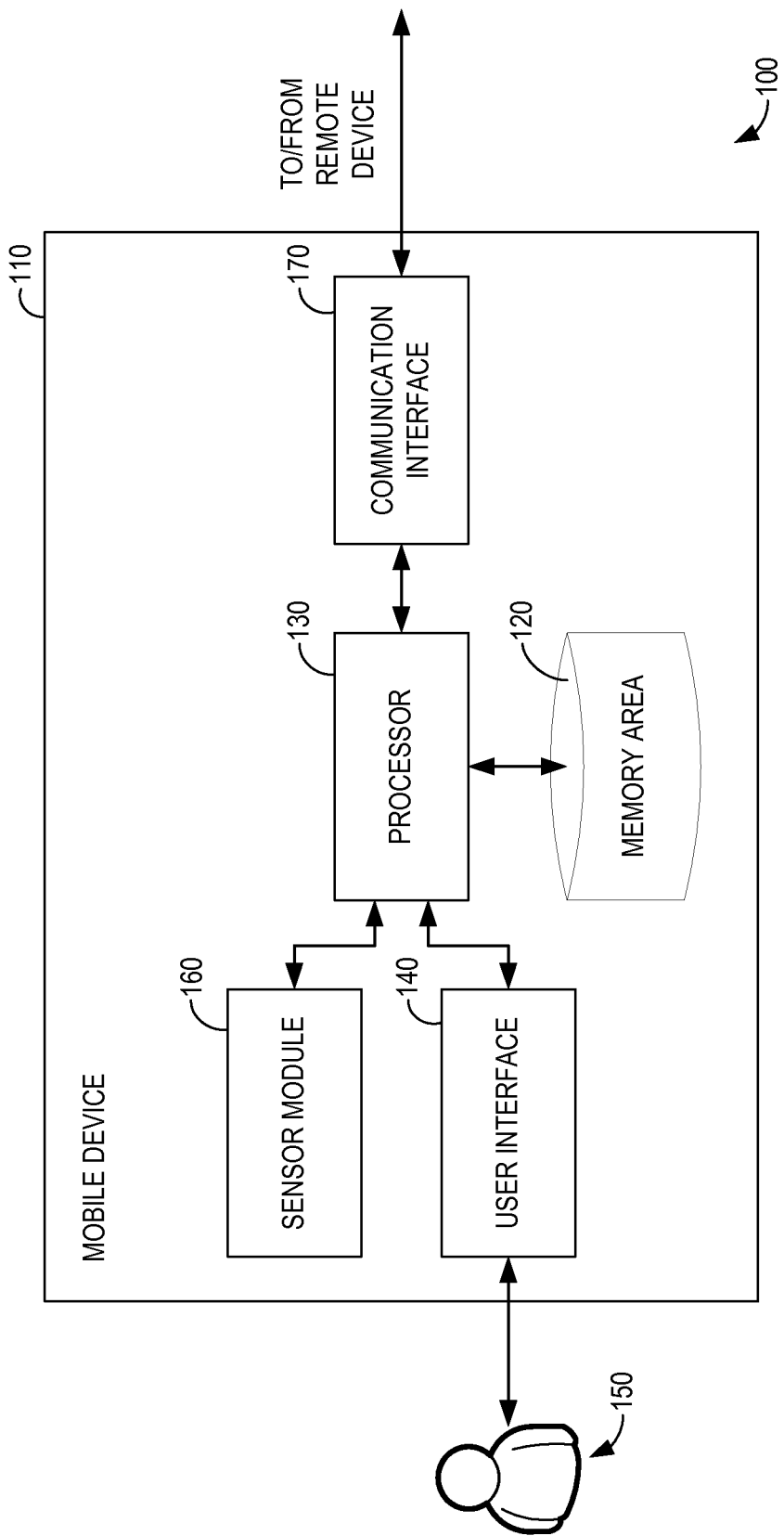
FIG. 1 is a block diagram of an example mobile device.

FIG. 1 is a block diagram of an example environment 100 including a mobile device 110. In some examples, the mobile device 110 may be and/or include a laptop, a smartphone, a tablet, a phablet, a mobile telephone, a portable media player, a netbook, a computing pad, a desktop computer, a set-top box, a game console, a kiosk, a tabletop device, and/or any other computing device. While some examples of the disclosure are illustrated and described herein with reference to a mobile device 110, aspects of the disclosure are operable with any computing device that executes instructions to implement the operations and functionality associated with the computing device.

In this example, the mobile device 110 includes one or more computer-readable media, such as a memory area 120 storing computer-executable instructions, biometric data, medical and diagnostic images, machine data, and/or other data, and one or more processors 130 programmed to execute the computer-executable instructions for implementing aspects of the disclosure. The memory area 120 includes any quantity of media associated with or accessible by the computing device. The memory area 120 may be internal to the computing device (as shown in FIG. 1), external to the computing device (not shown), or both (not shown).

In some examples, the memory area 120 stores, among other data, one or more applications. The applications, when executed by the processor 130, operate to perform a functionality on the mobile device 110. Example applications include a mail application program, a web browser, a calendar application program, an address book application program, a messaging program, a media program, a location-based service program, a search program, and the like. The applications may communicate with counterpart applications or services, such as web services accessible via a network (not shown). For example, the applications may represent downloaded client-side applications that correspond to server-side services executing in the cloud.

The processor 130 includes any quantity of processing units, and the instructions may be performed by the processor 130 or by multiple processors within the computing device or performed by a processor external to the computing device. In some examples, the processor 130 is transformed into a special purpose microprocessor by executing computer-executable instructions or by otherwise being programmed. Although the processor 130 is shown separate from the memory area 120, examples of the disclosure contemplate that the memory area 120 may be onboard the processor 130 such as in some embedded systems.

In some examples, the mobile device 110 includes one or more user interfaces 140 for exchanging data between the mobile device 110 and a user 150. For example, the user interface 140 includes and/or is coupled to a presentation device configured to present information, such as text, images, audio, video, graphics, alerts, and the like, to the user 150. The presentation device may include, without limitation, a display, a speaker, and/or a vibrating component. Additionally or alternatively, the user interface 140 includes and/or is coupled to an input device (not shown) configured to receive information, such as user commands, from the user 150. The input device may include, without limitation, a controller, a camera, a microphone, and/or an accelerometer. In at least some examples, the presentation device and the input device are integrated in a common user interface 140 configured to present information to the user 150 and receive information from the user 150. For example, the user-interface device may include, without limitation, a capacitive touch screen display and/or a controller including a vibrating component.

In this example, a user interface 140 includes and/or is coupled to at least one sensor module 160. For example, the sensor module 160 may include a circuit board (not shown) and an image sensor (shown, e.g., in FIG. 2) coupled to the circuit board. In at least some examples, the image sensor is a complementary metal-oxide semiconductor (CMOS) and/or chard-coupled device (CCD) image sensor. Alternatively, the image sensor may be any type of sensor that enables the mobile device 110 to function as described herein.

In some examples, the mobile device 110 includes at least one communication interface 170 for exchanging data between the mobile device 110 and a computer-readable media and/or another computing device. Communication between the mobile device 110 and a computer-readable media and/or another computing device may occur using any protocol or mechanism over any wired or wireless connection. For example, the mobile device 110 may communicate with a computer-readable media and/or another computing device using a BLUETOOTH brand wireless technology standard, using a WI-FI brand wireless technology standard (e.g., IEEE 802.11), and/or via a cellular network (e.g., 3G, 4G). (BLUETOOTH is a trademark of Bluetooth Special Interest Group; WI-FI is a trademark of the Wi-Fi Alliance).

The block diagram of FIG. 1 is merely illustrative of an example environment that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 1 may be performed by other elements in FIG. 1, or an entity (e.g., processor, web service, server, applications, computing device, etc.) not shown in FIG. 1.

Figure 2:
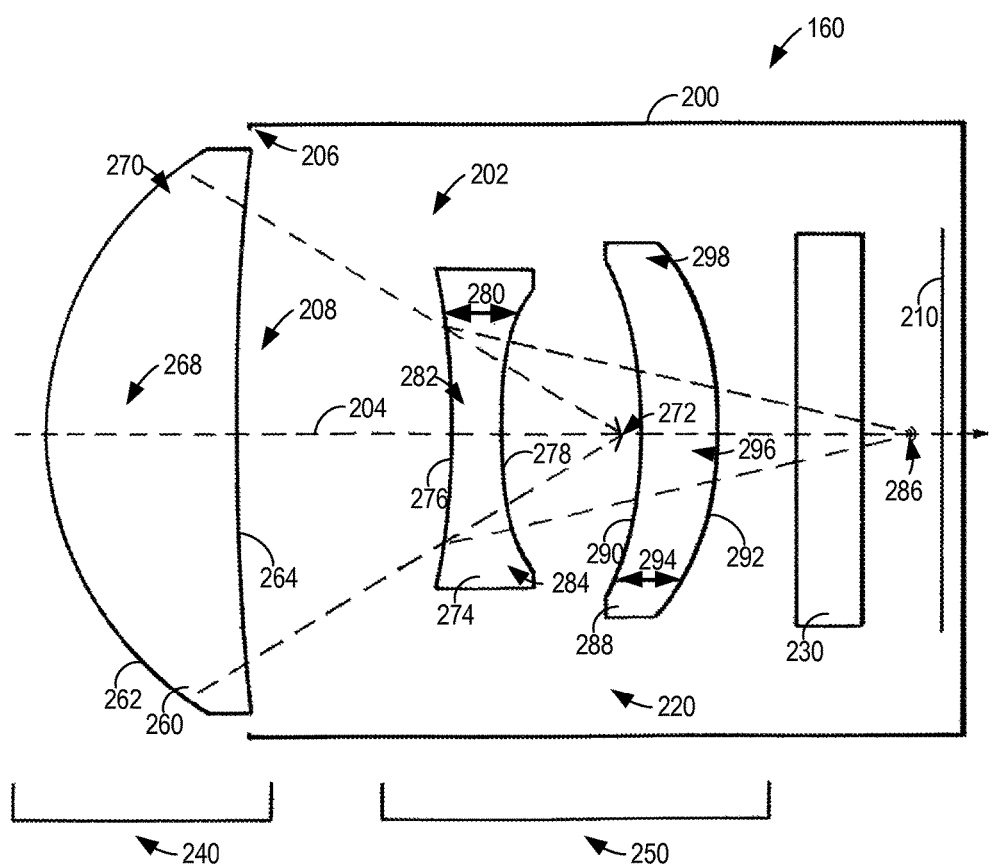
FIG. 2 is a schematic illustration of a sensor module that may be used with a mobile device, such as the mobile device shown in FIG. 1.
Figure 3:
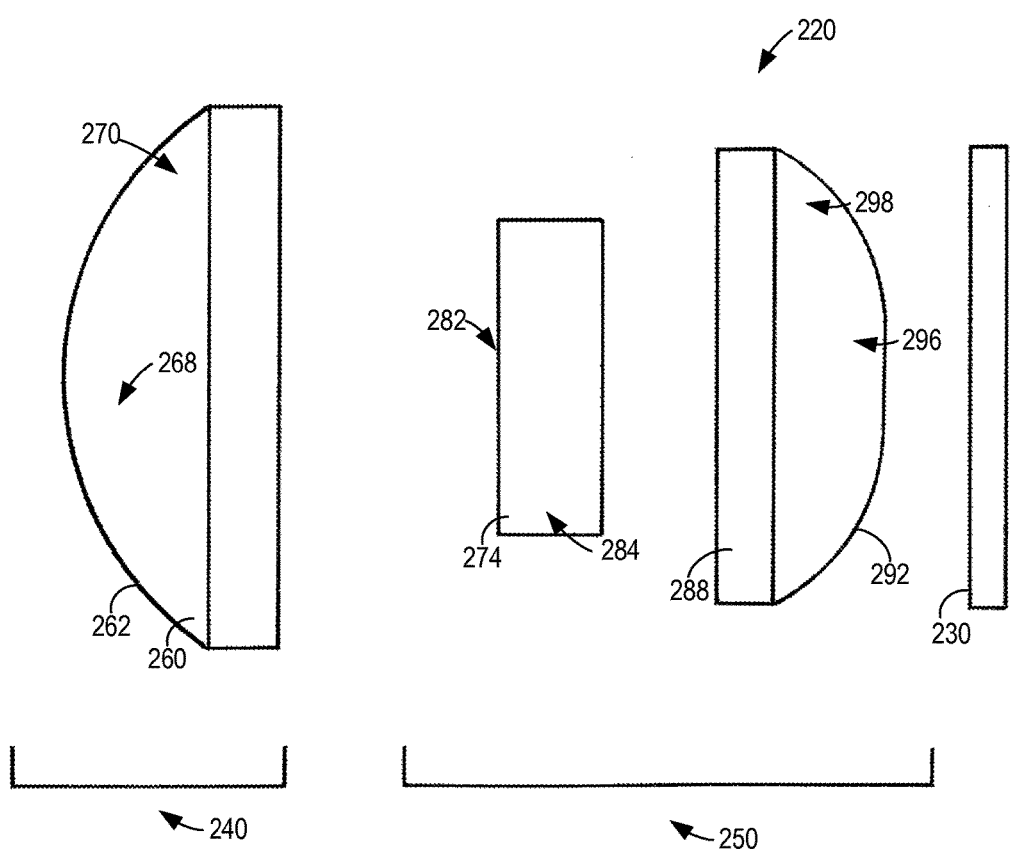
FIG. 3 is a plan view of an example lens assembly that may be used with a sensor module, such as the sensor module shown in FIG. 2.

FIG. 2 is a perspective view of the sensor module 160. In some examples, the sensor module 160 includes a barrel and/or housing 200 that at least partially defines a cavity 202 configured to house a plurality of optical components arranged along an optical axis 204. In this example, the housing 200 has an inner surface 206 that defines an aperture 208. The aperture 208 is sized, shaped, and/or configured to allow light (e.g., one or more light rays) to enter the cavity 202. In this example, the housing 200 houses an image sensor 210 and a lens assembly 220 within the cavity 202. FIG. 3 is a plan view of the lens assembly 220. The image sensor 210 may be any suitable type of image sensor including, without limitation, a CMOS sensor and/or a CCD sensor.

In some examples, the sensor module 160 includes a filter 230 (e.g., band-pass filter, infrared filter) configured to allow or pass at least a first light (e.g., visible light) through the filter 230 and/or block or restrict at least a second light (e.g., infrared light) from passing through the filter 230. In this example, the filter 230 is positioned adjacent the image sensor 210 along the optical axis 204 to filter at least some light at a location proximate to the image sensor 210. Alternatively, the filter 230 may be positioned at any location that enables the sensor module 160 to function as described herein.

The lens assembly 220 is configured to capture light, and bend the captured light into a flat field of focus on the image sensor 210. In at least some examples, the image is suitable for various purposes, such as biometric identification, medical and diagnostic images, and/or machine vision. In some examples, the lens assembly 220 includes a first stage 240 and a second stage 250. Alternatively, the lens assembly 220 may include any number of stages that enables the lens assembly 220 to function as described herein.

The lens assembly 220 is configured to function in a predetermined spectrum of light. For example, the lens assembly 220 may be configured to function in a band of infrared light (e.g., approximately 700 nm-approximately 1000 nm). In this disclosure, unless otherwise stated, adjectives such as "approximately", "substantially", and "about" modifying a condition or relationship characteristic of a feature or features of an embodiment of the disclosure are understood to mean that the condition or characteristic is defined to within tolerances that are acceptable for operation of the embodiment for an application for which it is intended. Infrared light may be desired for at least some iris imaging operations. In one example, the lens assembly 220 is configured to function in a spectrum of near-infrared light of a light emitting diode (LED) light source (e.g., approximately 830 nm-approximately 870 nm). Additionally or alternatively, the lens assembly 220 may be configured to function as described herein in at least a portion of a visible light wavelength band (e.g., approximately 400 nm-approximately 700 nm). Shorter wavelengths may be desired for at least some relatively high resolution operations. The lens assembly 220 may be configured to function with any spectrum of light that enables the lens assembly 220 to function as described herein.

In some examples, the first stage 240 includes a first lens 260 positioned at and/or proximate to a front of the lens assembly 220 along the optical axis 204. In this example, the first lens 260 is within the aperture 208. Alternatively, the first lens 260 may be at any location that enables the lens assembly 220 to function as described herein. As used herein, the term "front" refers to a position that is proximate to the aperture 208, and the term "rear" refers to a position that is proximate to the image sensor 210. While a single lens is shown for each lens (e.g., first lens 260), it will be understood that, in other examples, each lens may include a plurality of lenses that, when combined, have the respective optical characteristics described herein for each lens and that the term "lens" as used herein may also refer to such plural lens arrangement.

The first lens 260 is configured to provide a high positive optical power. In this example, the first lens 260 is a positive, generally meniscus lens having a relatively-steep convex front surface 262 and a relatively-gentle concave rear surface 264 (shown in FIG. 2) such that a thickness 266 (shown in FIG. 2) of the first lens 260 (e.g., distance between the front surface 262 and the rear surface 264) is thicker at an inner portion 268 than at an outer portion 270. In this example, the first lens 260 is an aspheric lens, and the front surface 262 and/or the rear surface 264 are aspheric surfaces.

The first lens 260 is configured to bend incoming light towards a first focal point 272 (shown in FIG. 2). In this example, the first lens 260 is a stronger positive lens than the other lens in the lens assembly 220. The first lens 260 is configured to bend light across a desired field of view such that an amount of light at a position proximate to an edge of the field of view is comparable with the amount of light at a position proximate to the center of the field of view. The field of view provides a desired coverage of an area that allows imaging of one or both eyes of a user. The first lens 260 is configured to bend light for the desired field of view with little to no distortion and such that sharpness is ensured across a desired field of view. The first lens 260 enables the lens assembly 220 to have a track length such that the lens assembly 220 may be housed within a mobile device 110 and/or housing 200. In at least some examples, the first lens 260 enables the track length (e.g., a total track length) to be less than or equal to approximately 6.0 mm. Alternatively, the track length may be any distance that enables the lens assembly 220 to be used in a mobile device environment 100. While the first stage 240 is shown including a single lens (e.g., first lens 260), it will be understood that, in other examples, the first stage 240 may include a plurality of lenses that, when combined, have the optical characteristics described herein for the first stage 240.

In some examples, the second stage 250 is a telephoto stage that is configured to provide negative optical power. In this example, the second stage 250 enables the lens assembly 220 to have a focal length that is greater than or equal to the track length. The second stage 250 is configured to bend light such that an image generated from the light emitted from the second stage 250 may have a desired resolution for at least some applications (e.g., iris detection, iris imaging). For example, an image resolution of approximately 160-200 pixels per iris may be desired for iris recognition applications. To generate an image having an image having an image resolution of approximately 160-200 pixels per iris, in this example, the lens assembly 220 has a focal length of approximately 7.3 mm for near-infrared light.

In some examples, the second stage 250 includes a second lens 274 positioned behind the first lens 260 along the optical axis 204. In this example, the second lens 274 is positioned within the cavity 202. Alternatively, the second lens 274 may be at any location that enables the lens assembly 220 to function as described herein.

The second lens 274 is configured to provide a negative optical power. In this example, the second lens 274 is a negative, generally biconcave lens having a relatively-gentle concave front surface 276 (shown in FIG. 2) and a relatively-steep concave rear surface 278 (shown in FIG. 2) such that a thickness 280 (shown in FIG. 2) of the second lens 274 (e.g., distance between the front surface 276 and the rear surface 278) is thinner at an inner portion 282 than at an outer portion 284. In this example, the second lens 274 is an aspheric lens, and the front surface 276 and/or the rear surface 278 are aspheric surfaces.

The second lens 274 is a telephoto lens configured to bend incoming light towards a second focal point 286 (shown in FIG. 2) farther back than the first focal point 272 (e.g., farther from the aperture 208 and/or first lens 260). The second lens 274 is configured to bend light across a desired field of view such that an amount of light at a position proximate to an edge of the field of view is comparable with the amount of light at a position proximate to the center of the field of view. The field of view provides a desired coverage of an area that allows imaging of one or both eyes of a user. The second lens 274 is configured to bend light for the desired field of view with little to no distortion and such that sharpness is ensured across a desired field of view. In at least some examples, the second lens 274 is configured to adjust, correct, and/or limit an effect of chromatic aberration. For example, the second lens 274 may be fabricated from a lens material, such as polycarbonate, acrylic, and/or polystyrene that enables the second lens 274 to adjust, correct, and/or limit an effect of chromatic aberration. Alternatively, the second lens 274 may be fabricated from any material that enables the lens assembly 220 to function as described herein.

In some examples, the second stage 250 includes a third lens 288 positioned behind the second lens 274 along the optical axis 204. In this example, the third lens 288 is positioned within the cavity 202. Alternatively, the third lens 288 may be at any location that enables the lens assembly 220 to function as described herein.

In some examples, the third lens 288 is configured to provide a positive or a negative optical power. In this example, the third lens 288 is a positive, generally meniscus lens having a relatively-gentle concave front surface 290 (shown in FIG. 2) and a relatively-steep convex rear surface 292 such that a thickness 294 (shown in FIG. 2) of the third lens 288 (e.g., distance between the front surface 290 and the rear surface 292) is thicker at an inner portion 296 than at an outer portion 298. In this example, the third lens 288 is an aspheric lens, and the front surface 290 and/or the rear surface 292 are aspheric surfaces.

In some examples, the third lens 288 is configured to increase a sharpness and/or reduce a distortion and/or field curvature of an image on the image sensor 210. In at least some examples, the third lens 288 is configured to bend incoming light based on a distance from the optical axis 204. For example, a light ray transmitted through the inner portion 296 is bent to a lesser degree than a light ray transmitted through the outer portion 298 and/or a light ray transmitted through the outer portion 298 is bent to a greater degree than a light ray transmitted through the inner portion 296. The third lens 288 is configured to bend light across a desired field of view such that an amount of light at a position proximate to an edge of the field of view is comparable with the amount of light at a position proximate to the center of the field of view. The field of view provides a desired coverage of an area that allows imaging of one or both eyes of a user. The third lens 288 is configured to bend light for the desired field of view with little to no distortion and such that sharpness is ensured across a desired field of view. Accordingly, in this example, the inner portion 296 is configured to adjust, correct, and/or limit the field curvature to a first extent, and the outer portion 298 is configured to adjust, correct, and/or limit the field curvature to a second extent greater than the first extent.

In this example, the third lens 288 is positioned such that the lens assembly 220 has a back focal length (e.g., distance between the rear surface 292 of the third lens 288 the focal point on the image sensor 210) is greater than or equal to approximately 1.0 mm. The back focal length allows for focal adjustment and/or use of one or more filters 230 in front of the image sensor 210. While the second stage 250 is shown including two lenses (e.g., second lens 274 and third lens 288), it will be understood that, in other examples, the second stage 250 may include a plurality of lenses that, when combined, have the optical characteristics described herein for the second stage 250.

The first lens 260, second lens 274, and/or third lens 288 may be constructed in any suitable manner. For example, the first lens 260, second lens 274, and/or third lens 288 may be fabricated from a plastic material and/or a glass material. Plastic materials may help reduce material and/or manufacturing costs, and glass materials may help improve thermal stability. The materials of the first lens 260, second lens 274, and/or third lens 288 may be different from one another in order to adjust, correct, and/or limit color, reduce field of curvature and distortion, etc. In this example, each of the first lens 260, second lens 274, and third lens 288 includes a plurality of aspheric surfaces to adjust, correct, and/or limit for rays falling on the peripherals of the lens surfaces. This may help to reduce optical aberrations, thereby helping to open up the aperture size of the housing 200.

Figure 4:
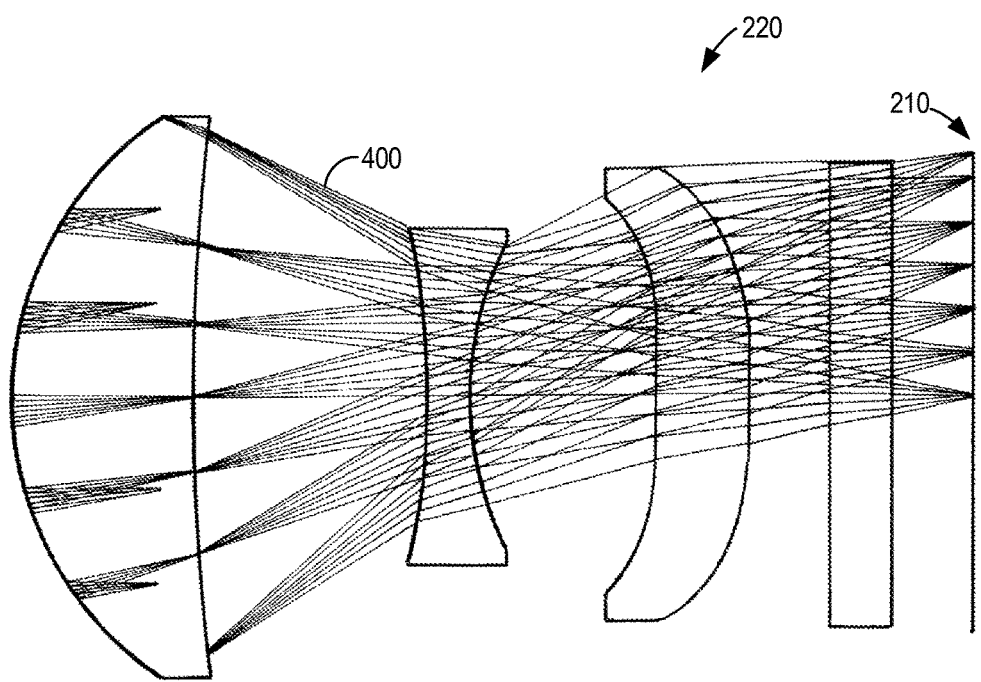
FIG. 4 is a schematic illustration of an example implementation of a lens assembly, such as the lens assembly shown in FIG. 3.

FIG. 4 is a schematic illustration of one implementation of the lens assembly 220. In this example, the lens assembly 220 is configured for use with an image sensor 210 configured to generate one or more images having a pixel size of approximately 1.4 microns square. FIG. 4 illustrates how various light rays 400 traverse through the lens assembly 220. In some examples, the lens assembly 220 is configured to enable a Modulation Transfer Function (MTF) value greater than or equal to approximately 0.15 (e.g., 15%) to be achieved at approximately 357 line pairs per millimeter (lp/mm), which would provide a pixel resolution of approximately 1.4 micron when imaging an object (e.g., an iris) at approximately 400 mm across a field of view of approximately 22 degrees. In at least some examples, the lens assembly 220 enables an MTF of greater than or equal to approximately 0.60 (e.g., 60%) to be achieved at approximately 178 lp/mm across a field of view of approximately 22 degrees. The lens assembly 220 also produces less than or equal to approximately 2% of distortion and greater than or equal to approximately 90% illumination uniformity across a field of view of approximately 22 degrees.

Figure 5:
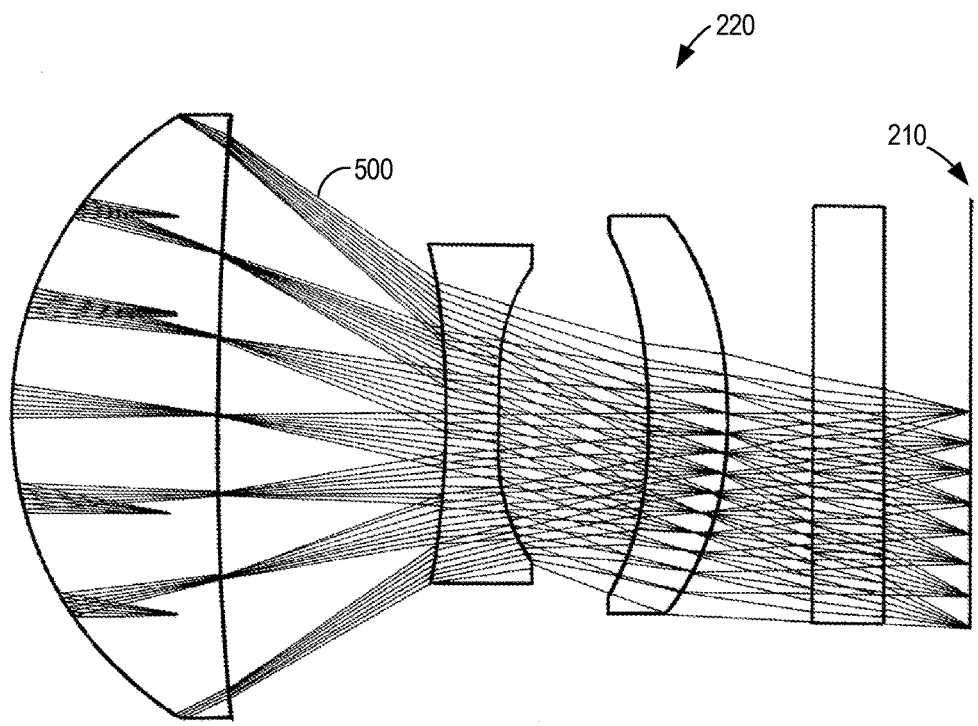
FIG. 5 is a schematic illustration of another example implementation of a lens assembly, such as the lens assembly shown in FIG. 3.

FIG. 5 is a schematic illustration of another implementation of the lens assembly 220. In this example, the lens assembly 220 is configured for use with image sensor 210 configured to generate one or more images having a pixel size of approximately 1.1 microns square. FIG. 5 illustrates how various light rays 500 traverse through the lens assembly 220. The smaller pixel size enables a higher-resolution image (e.g., an image resolution greater than approximately 200 pixels per iris for a working distance or approximately 400 mm) to be generated and/or the track length to be shortened (e.g., shorter than 6 mm). In these implementations, the lens assembly 220 enables at least a predetermined number of pixels (e.g., approximately 160-200 pixels per iris) that provide reliable and/or robust data to cover an iris of a user (e.g., user 150).

Figure 6:
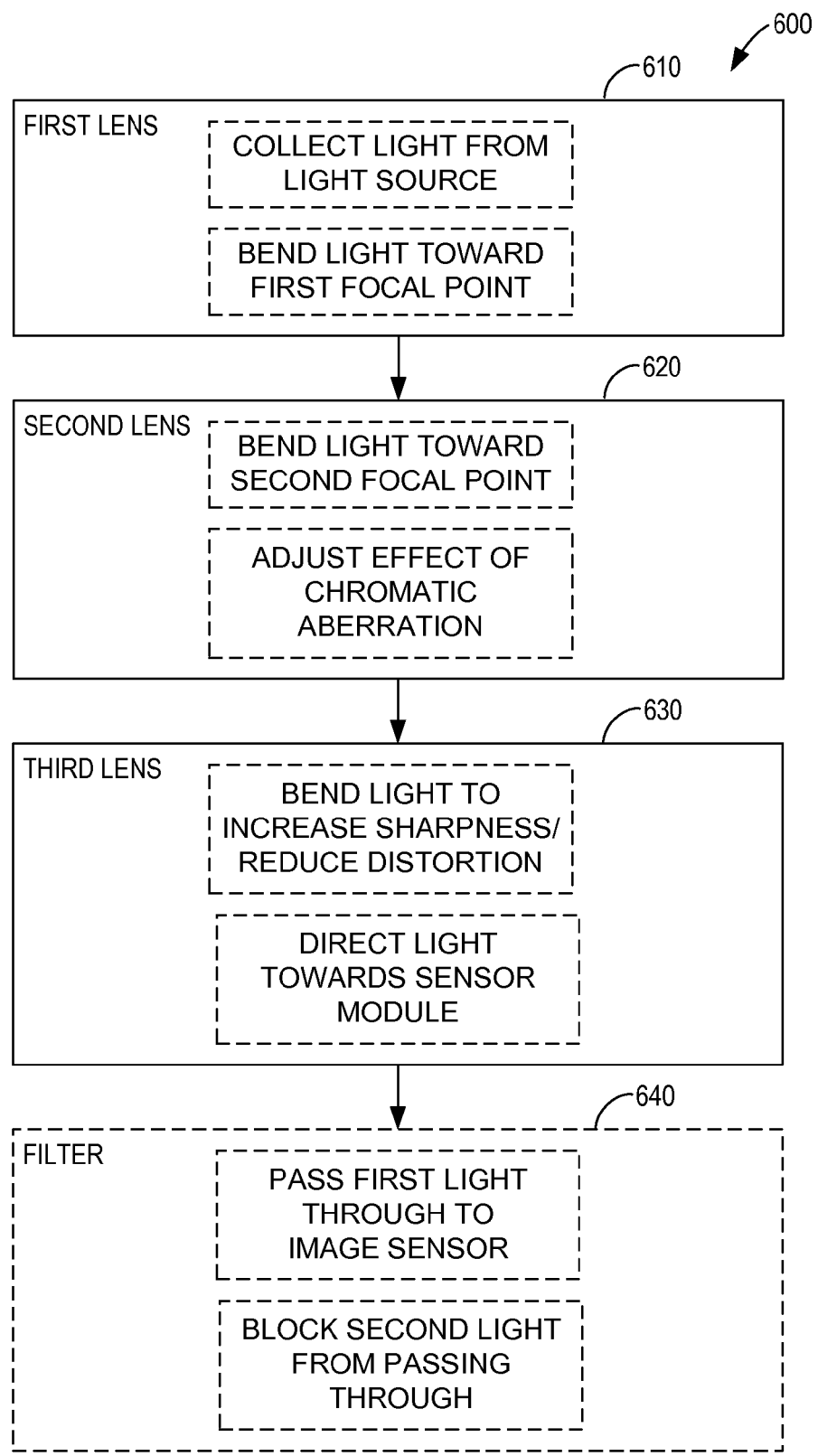
FIG. 6 is a flow chart illustrating an example method of collecting light using a sensor module, such as the sensor module shown in FIG. 2.

FIG. 6 is a flow chart illustrating an example method 600 of collecting light using a sensor module 160. The method 600 includes, at 610, using a first lens 260 configured to provide positive optical power to collect light from a light source, bend the light rays, and direct the light rays towards a first focal point 272. At 620, a second lens configured to provide negative optical power is used to collect light rays from the first lens 260, bend light rays toward a second focal point 286 a second distance farther from the first lens 260 than the first distance, and/or adjust an effect of chromatic aberration. At 630, a third lens 288 is used to collect light rays from the second lens 274, bend light rays to increase sharpness and/or reduce distortion, and direct light rays towards an image sensor 210. For example, one or more first light rays traversing an inner portion 296 of the third lens 288 are corrected to a first extent, and one or more second light rays traversing an outer portion 298 of the third lens 288 are corrected to a second extent greater than the first extent. In at least some examples, a filter 230 is used at 640 to pass a first light ray (e.g., visible light) through towards the image sensor 210 and/or block a second light ray (e.g., infrared light) from passing through the filter 230.

The subject matter described herein enables a mobile device to generate high quality images suitable for a variety of applications. In some examples, a lens assembly housed within a mobile device has a focal length that enables the lens assembly to generate one or more images that satisfy image quality specifications for iris recognition applications. For example, the lens assembly provides a desired resolution, magnification, distortion, etc. In this way, the mobile device may be used to generate high quality images while maintaining a low profile.

Although described in connection with an example computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

The examples illustrated and described herein as well as examples not specifically described herein but within the scope of aspects of the disclosure constitute example means for bending light rays towards a first focal point, example means for bending light rays towards a second focal point, and/or example means for directing light rays toward a sensor module.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," 'including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:

a lens barrel including a housing that at least partially defines a cavity therein;

a lens barrel including an inner surface that defines an aperture;

a first lens configured to provide positive optical power;

a first lens having one or more aspheric surfaces;

a first lens within an aperture;

a telephoto stage including a second lens and a third lens;

a telephoto stage configured to provide negative optical power.

a second lens configured to provide negative optical power;

a second lens having one or more aspheric surfaces;

a second lens that is a telephoto lens;

a second lens configured to adjust a chromatic aberration of the image;

a second lens within a cavity;

a third lens configured to provide positive optical power;

a third lens configured to perform increasing a sharpness and/or decreasing a distortion of an image;

a third lens configured to adjust a field curvature of the image;

a third lens including an inner portion configured to adjust the field curvature to a first extent, and an outer portion configured to adjust the field curvature to a second extent greater than the first extent;

a third lens having one or more aspheric surfaces;

a third lens within a cavity;

a lens assembly having a track length that is less than or equal to approximately 6.0 mm;

a lens assembly having a track length that enables the lens assembly to be positioned within the housing;

a lens assembly having a focal length that is greater than or equal to approximately 7.3 mm;

a lens assembly having a focal length that is greater than or equal to the track length;

a lens assembly having a back focal length greater than or equal to approximately 1.0 mm;

bending, at a first lens having one or more aspheric surfaces, a plurality of light rays towards a first focal point a first distance from the first lens;

bending, at a second lens having one or more aspheric surfaces, a plurality of light rays towards a second focal point a second distance farther from the first lens than the first distance;

directing, at a third lens having one or more aspheric surfaces, the plurality of light rays towards a sensor module such that the sensor module is configured to generate an image based on the plurality of light rays;

adjusting, at the second lens, a chromatic aberration of the image; and adjusting, at the third lens, a field curvature of the image, wherein one or more first light rays traversing an inner portion of the third lens are adjusted to a first extent, and one or more second light rays traversing an outer portion of the third lens are adjusted to a second extent greater than the first extent.

While the aspects of the disclosure have been described in terms of various examples with their associated operations, a person skilled in the art would appreciate that a combination of operations from any number of different examples is also within scope of the aspects of the disclosure.

What is claimed is:

1. A lens assembly comprising:
    a first lens configured to provide positive optical power; and
    a telephoto stage comprising a second lens and a third lens, the second lens configured to provide negative optical power, and the third lens configured to perform one or more of increasing a sharpness or decreasing a distortion of an image associated with light transmitted through the lens assembly,
    wherein the first lens is a positive meniscus lens with a convex front surface and a concave rear surface, the second lens is a negative biconcave lens with a concave front surface and a concave rear surface, a curvature of the concave rear surface of the second lens is greater than a curvature of the concave front surface of the second lens, and the third lens is a positive meniscus lens with a concave front surface and a convex rear surface, and
    wherein the lens assembly has a back focal length greater than or equal to approximately 1.0 mm.

2. The lens assembly of claim 1, wherein the first lens has one or more aspheric surfaces, and wherein the first lens comprises a convex front surface and a concave rear surface such that a thickness of the first lens is thicker at an inner portion than at an outer portion of the first lens.

3. The lens assembly of claim 1, wherein the telephoto stage is configured to provide negative optical power.

4. The lens assembly of claim 1, wherein the second lens has one or more aspheric surfaces.

5. The lens assembly of claim 1, wherein the second lens is a telephoto lens.

6. The lens assembly of claim 1, wherein the second lens is configured to adjust a chromatic aberration of the image.

7. The lens assembly of claim 1, wherein the third lens has one or more aspheric surfaces, and wherein the third lens comprises a concave front surface and a convex rear surface such that a thickness of the third lens is thicker at an inner portion than at an outer portion of the third lens, the lens assembly having a track length that enables the lens assembly to fit within a mobile device and a focal length for near-infrared light.

8. The lens assembly of claim 1, wherein the third lens is configured to provide positive optical power.

9. The lens assembly of claim 1, wherein the third lens is configured to adjust a field curvature of the image, the third lens comprising an inner portion configured to adjust the field curvature to a first extent, and an outer portion configured to adjust the field curvature to a second extent greater than the first extent.

10. A mobile device comprising:
    a lens barrel comprising a housing that at least partially defines a cavity therein;
    an adjustable filter; and
    a lens assembly comprising:
    a first lens configured to provide positive optical power,
    a second lens configured to provide negative optical power, and a third lens configured to perform one or more of increasing a sharpness or decreasing a distortion of an image associated with light transmitted through the lens assembly, the second lens and the third lens positioned within the cavity, the lens assembly having a track length that enables the lens assembly to be positioned within the housing and a focal length that is greater than or equal to the track length, wherein the first lens is a positive meniscus lens with a convex front surface and a concave rear surface, the second lens is a negative biconcave lens with a concave front surface and a concave rear surface, a curvature of the concave rear surface of the second lens is greater than a curvature of the concave front surface of the second lens, the third lens is a positive meniscus lens with a concave front surface and a convex rear surface, and the adjustable filter is configured to allow at least a first light ray and block or restrict at least a second light ray, and wherein the lens assembly has a back focal length greater than or equal to approximately 1.0 mm.

11. The mobile device of claim 10, wherein the lens barrel includes an inner surface that defines an aperture, the first lens within the aperture.

12. The mobile device of claim 10, wherein each of the first lens, the second lens, and the third lens has a plurality of aspheric surfaces.

13. The mobile device of claim 10, wherein the second lens is configured to adjust a chromatic aberration of the image.

14. The mobile device of claim 10, wherein the third lens is configured to provide positive optical power.

15. The mobile device of claim 10, wherein the third lens is configured to adjust a field curvature of the image, the third lens comprising an inner portion configured to adjust the field curvature to a first extent, and an outer portion configured to adjust the field curvature to a second extent greater than the first extent.

16. A method for collecting light using a lens assembly, the method comprising:

bending, at a first lens having one or more aspheric surfaces, a plurality of light rays towards a first focal point a first distance from the first lens, the first lens configured to provide positive optical power, at least a portion of the plurality of light rays in a spectrum of near-infrared light of a light emitting diode light source;

bending, at a second lens having one or more aspheric surfaces, the plurality of light rays towards a second focal point a second distance farther from the first lens than the first distance, the second lens configured to provide negative optical power; and directing, at a third lens having one or more aspheric surfaces, the plurality of light rays towards a sensor module such that the sensor module is configured to generate an image based on the plurality of light rays, the third lens configured to perform one or more of increasing a sharpness or decreasing a distortion of the image, the lens assembly having a track length that is less than or equal to approximately 6.0 mm and a focal length that is greater than or equal to approximately 7.3 mm, wherein the first lens is a positive meniscus lens with a convex front surface and a concave rear surface, the second lens is a negative biconcave lens with a concave front surface and a concave rear surface, a curvature of the concave rear surface of the second lens is greater than a curvature of the concave front surface of the second lens, and the third lens is a positive meniscus lens with a concave front surface and a convex rear surface, and wherein the lens assembly has a back focal length greater than or equal to approximately 1.0 mm.

17. The method of claim 16, further comprising adjusting, at the second lens, a chromatic aberration of the image.

18. The method of claim 16, further comprising adjusting, at the third lens, a field curvature of the image, wherein one or more first light rays of the plurality of light rays traversing an inner portion of the third lens are adjusted to a first extent, and one or more second light rays of the plurality of light rays traversing an outer portion of the third lens are adjusted to a second extent, the second extent being greater than the first extent.

19. The method of claim 16, wherein the second and the third lens comprise a telephoto stage which is configured to provide negative optical power.

20. The method of claim 16, wherein the second lens has one or more aspheric surfaces.

\* \* \* \* \*